UNITED STATES PATENT OFFICE.

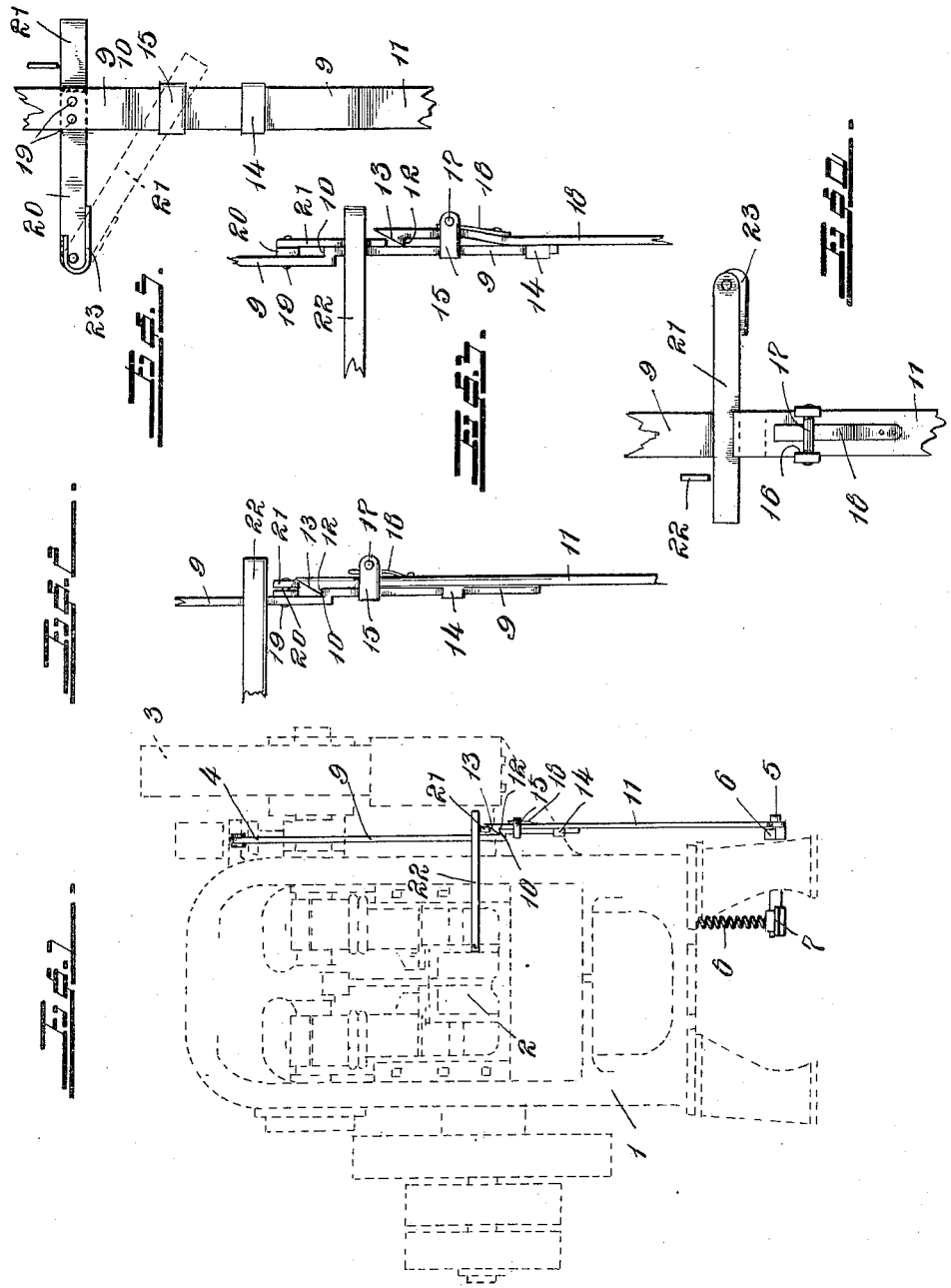

ALBERT G. SCHERER, OF CHICAGO, ILLINOIS, ASSIGNOR TO THE EXCELSIOR STEEL FURNACE COMPANY, OF CHICAGO, ILLINOIS, A CORPORATION OF ILLINOIS.

SAFETY DEVICE FOR CLUTCH-CONTROLLED MACHINES.

1,102,608.  Specification of Letters Patent.  Patented July 7, 1914.

Application filed February 10, 1913. Serial No. 747,289.

*To all whom it may concern:*

Be it known that I, ALBERT G. SCHERER, a citizen of the United States, and resident of Chicago, in the county of Cook and State of Illinois, have invented a new and useful Improvement in Safety Devices for Clutch-Controlled Machines, of which the following is a specification.

It is well known that a very large majority of the accidents sustained in the operation of machines is occasioned by the failure of the operator to stop the machine after the operation has been performed, the second or unintentional operation of the machine, or repetition, catching the operator and thereby inflicting the injury.

My present invention has relation to the provision of simple and effective mechanism for positively preventing an inadvertent repeat operation of such machine.

I attain the above object by the mechanism illustrated in the accompanying drawing, in which:

Figure 1 is a view of a clutch controlled punch press shown in dotted lines, and my safety control mechanism shown in full lines, the view being taken from the operator's side of the machine; Fig. 2 is an enlarged detail of the mechanism for breaking the control rod in unbroken condition and as seen from the operator's side of the machine; Fig. 3 is a view similar to Fig. 2 showing the control rod after the same has been broken; Fig. 4 is a side view of the mechanism shown in Fig. 2 looking from the outside; Fig. 5 is a view similar to Fig. 4 looking from the opposite side.

Similar reference numerals refer to similar portions of the several views.

The punch press is shown in dotted lines and consists substantially of the frame of the machine 1, the descending or punching member 2, the pulley 3, and the clutch 4 for communicating the power from the pulley to the mechanism of the machine. Any form of clutch may be employed, and so far as I am aware, each form of clutch is so arranged that when it is not operated a spring causes it to automatically disengage.

In the lower part of the frame of the machine is provided a rotatable shaft 5, having an arm 6, extending therefrom, and a treadle 7, also connected thereto. A spring 8 extends from the treadle 7 to the frame of the machine so as to assist in throwing the clutch out of operation. From the clutch mechanism 4 to the arm 6 extends the mechanism now to be described. This mechanism consists of a rod or strap 9 the lower end of which is offset to form a shoulder 10. Another rod or strap 11 is provided the upper end of which is formed with an offset portion 12 to engage the shoulder 10 the top thereof being beveled at 13, as clearly shown in Figs. 1, 2, and 3. A guideway 14 is provided upon the strap 11 in which the lower offset end of the strap 9 slides. A further strap or bridle 15 is provided around the rods 9 and 11 between the guideway 14 and the offset portion 10. This strap or bridle, as clearly shown in Fig. 4, sets into jogs or indentations 16 in the rod 11, and back of the rod 11 carries a bolt 17. A strap spring 18 is riveted to the rod 11 and extends upwardly against the bolt 17 thereby forcing the rod 11 against the rod 9. Extending rearwardly from the rod 9 and rigidly secured thereto by rivets 19, or in any other suitable way, is an arm 20 to the rear end of which is pivoted the releasing arm 21, the forward end of which extends between the rod 9 and the upper beveled portion of the rod 11.

Secured to the descending or punching member 2 of the press is an arm 22, which extends outwardly so as to engage and depress the arm 21 when the press is operated. There is a spring 23 on the rear of the member 20 which holds the arm 21 in elevated position when it is not being depressed by the arm 22.

The operation of the machine is as follows: The clutch is thrown into operation by depressing the treadle 7 which operates through the rods 11 and 9. As the punching portion of the machine descends the rod 22 engages and depresses the arm 21 forcing it between the rod 9 and the beveled portion of the rod 11, so as to force the offset portion 12 of the rod 11 from engagement with the shoulder or offset 10 of the rod 9, the clutch being thereby permitted to automatically disengage. When the operator takes his foot from the treadle 7, the spring 8 elevates the rod 11 so as to again cause the engagement of the offset portion 12 of the rod 11 with the offset shoulder 10 of the rod 9 which puts the mechanism in condition for again causing the operation of the machine.

Having described my invention, what I claim as new and desire to secure by Letters Patent is:—

1. A safety control device for reciprocating clutch controlled machines, comprising in combination with a reciprocating clutch controlled machine a rod adapted to be secured to the clutch control, and having an offset shoulder on the other end thereof, another rod adapted to engage said offset shoulder, and an arm pivoted to one of said rods and adapted to swing between the engaging portions of said rods so as to disengage them, a treadle for operating said last mentioned rod, and a member carried by the reciprocating portion of said machine and adapted to actuate said pivoted arm.

2. A safety device for reciprocating clutch controlled machines, comprising in combination with a reciprocating clutch controlled machine a rod adapted to be secured to the clutch control and having an offset shoulder upon the other end thereof, another rod adapted to engage said offset shoulder, an arm pivoted to one of said rods and adapted to swing between and disengage said rods, a treadle for operating said last mentioned rod, a member carried by the reciprocating portion of said machine and adapted to actuate the said pivoted arm, and a spring for causing the reëngagement of said rods after the treadle has been released.

In testimony whereof I affix my signature in the presence of two witnesses.

ALBERT G. SCHERER.

Witnesses:
BENJ. T. ROODHOUSE,
G. W. HILTABRAND.

---

Copies of this patent may be obtained for five cents each, by addressing the "Commissioner of Patents, Washington, D. C."